T. B. MILLER.
SYSTEM FOR GENERATING ELECTRIC CURRENTS OF HIGH FREQUENCY.
APPLICATION FILED NOV. 16, 1912.
1,122,975.
Patented Dec. 29, 1914.
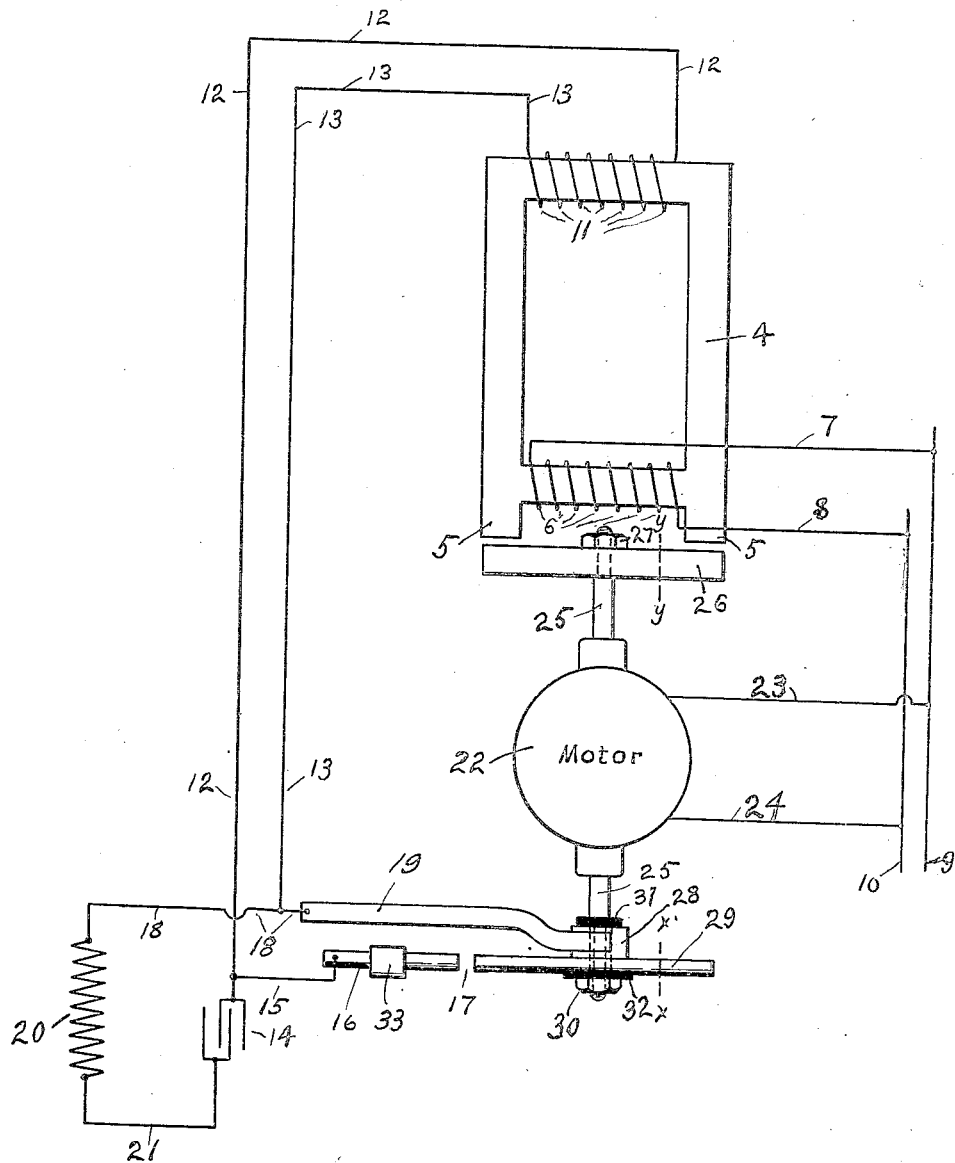
WITNESSES:
F. C. Matheny
Frank Warren
INVENTOR
Thomas B. Miller
BY
C. D. Haskins
ATTORNEY

UNITED STATES PATENT OFFICE.

THOMAS BURTON MILLER, OF SEATTLE, WASHINGTON, ASSIGNOR OF ONE-HALF TO SMITH CANNERY MACHINES COMPANY, OF SEATTLE, WASHINGTON, A CORPORATION OF WASHINGTON.

SYSTEM FOR GENERATING ELECTRIC CURRENTS OF HIGH FREQUENCY.

1,122,975.  Specification of Letters Patent.  Patented Dec. 29, 1914.

Application filed November 16, 1912. Serial No. 731,891.

*To all whom it may concern:*

Be it known that I, THOMAS BURTON MILLER, citizen of the United States, residing at Seattle, in the county of King and State of Washington, have invented a certain new and useful Improvement in Systems for Generating Electric Currents of High Frequency, of which the following is a specification.

My invention relates to improvements in devices for causing and controlling magnetic leakage in alternating current transformers that are employed in connection with the transmitting apparatus of wireless telegraph systems; and the object of my improvement is to provide an alternating current transformer with simple and practical devices adapted to cause a desired varying degree of magnetic leakage, or diversion of magnetic lines of force, from one to another part of its core, and further adapted to control the frequency of variations in the amount of such leakage or diversion with respect to variations in the distance between movable and fixed members of the spark-gap of the oscillating circuit of the transmitting portion of a wireless telegraph station, whereby the condenser of such oscillating circuit, at desired successive instants of time, may be charged to a higher degree, in a given time, through its associated inductance and whereby such condenser may be caused to be fully discharged with corresponding frequency through such inductance.

I attain this object by devices and associated circuits which are diagrammatically represented in the accompanying drawing wherein the figure is a diagram of the parts of my invention as connected in the circuits of the transmitting portion of a wireless telegraph system.

In the drawing, 4 represents the form of an iron core of a transformer which core 4 is provided with projecting extension poles 5—5, projecting from each side of one end of its rectangular form, and that part of such core 4 which extends from side to side adjacent to poles 5—5 is surrounded with a primary helix 6 whose terminals are connected by wires 7 and 8 respectively to a source of an alternating current of electricity through main line conductors 9 and 10. That portion of such core 4 which extends from side to side thereof of the opposite end is surrounded with a secondary helix 11 one of whose terminals is connected by a conductor 12 with one terminal of a condenser 14 of an oscillating circuit and by a branch wire 15 with an adjustable electrode member 16 of a spark-gap 17 of the same oscillating circuit, while the other terminal of the secondary helix 11 is connected by a conductor 13 to a conductor 18 which electrically unites a contact spring 19 and one terminal of an inductance 20 of an oscillating circuit, the other terminal of said inductance 20 being connected by conductor 21 with the other terminal of condenser 14 of the same oscillating circuit.

A synchronous alternating current motor 22, may be supplied with current for operation through wires 23 and 24 connected respectively with main wires 9 and 10 which may lead to an alternating current dynamo machine, not shown. On one end of the shaft 25 of the motor 22 is adjustably mounted an iron bar 26 which may be turned or moved circumferentially to a desired position on said shaft 25 by loosening a clamping nut 27 which is adapted to secure the bar 26 in such desired circumferential position.

The motor 22 is disposed with relation to the transformer core 4 so that the iron bar 26 may rotate end over end in front of and adjacent to the poles 5—5 of the core 4 whereby magnetic lines of force generated in the core 4 by the primary helix 6 may be diverted and caused to flow through the iron bar 26 as the end portions of such iron bar 26 in their rotation pass the poles 5—5. Upon the other end of said shaft 25 of motor 22 is adjustably mounted a metal hub 28 and a piece of metal rod 29 which hub 28 and rod 29 are electrically united and adapted to be moved or turned circumferentially to a desired circumferential position with respect to shaft 25 by loosening a nut 30 which may secure them in such desired position. The hub 28 and rod 29 are electrically insulated from said shaft 25 by means of a bushing 31 and a washer 32 both of non-conducting material, as hard rubber or vulcanized fiber. Thus the rod 29 may be disposed circumferentially on the shaft 25 to any desired position with relation to the iron bar 26. The connecting contact spring 19 is so disposed that its free end may rest on the hub 28 to maintain electrical contact therewith during the rotation of the shaft 25 of the motor 22 while the adjustable electrode 16 is disposed in a support 33 so that it may be moved endwise in such support 33 to a desired position adjacent to the path of the rod 29 whereby a spark-gap 17 of desired dimension may be attained between the electrode 16 and the ends of the rod 29 as such ends move past said electrode 16 when rod 29 is revolved end over end on shaft 25.

To operate my invention with its parts disposed as shown, the bar 26 is disposed and fixed on the shaft 25 in such relation with the circumferential position of the rod 29 that, after the motor 22 is started, when the condenser 14 is being discharged through the inductance 20 and across the spark-gap 17 then such cross bar 26 shall be moving across the poles 5—5 of core 4 to divert the magnetic lines of force (generated by the primary helix 6) from their normal path along the sides of core 4 and through the secondary helix 11 and cause them to flow through poles 5—5 and the bar 26 thus to lessen or prevent the generation, at that moment, of current in the secondary helix which current if generated at such moment would flow in conductors 12 and 13 to maintain the same potential between the terminals of condenser 14 thus to cause an arc 17 to persist, between the electrode 16 and the rotating bar 29, through a longer portion of the circular path of the end of the bar 29 and thereby needlessly heat up said electrodes 16 and 29. Obviously, when the bar 26 and the rod 29 are so relatively disposed then the condenser 14 will be highly charged while the end portions of bar 26 are moving far from poles 5—5 since there will be no diversion of magnetic lines of force from the path through the secondary helix 11 and since the ends of rod 29, at the same time, will be moving at such distance from electrode 16 that no sparking or arcing can take place across spark-gap 17. Thus, as compared with means heretofore employed in generating oscillatory energy in the transmission circuits of a wireless telegraph station the conjoint action of the iron bar 26 and the rotary spark-gap 17 serves to charge to a higher degree the condenser 14 and to permit the nearer complete discharge of such condenser 14 across the spark-gap 17.

What I claim is:

1. In a wireless telegraph system, the combination with the oscillating circuit of a wireless telegraph station, of a transformer whose primary helix is connected with a source of varying electric current, a motor connected with said source of electric current, an iron bar associated with said motor and with said transformer and connected so as to be moved and actuated by said motor to affect the flow of magnetic lines of force in parts of said transformer at desired successive instants of time, a movable spark-gap electrode adapted to be moved by said motor while maintained in a constant position with respect to the position of said iron bar, and a normally fixed spark-gap electrode disposed within sparking distance of said movable spark-gap electrode and in said oscillating circuit.

2. In a wireless telegraph system, the combination with a transformer whose primary helix is disposed to surround one portion of its iron core while its secondary helix is disposed to surround another and different portion of its said iron core, of conducting wires adapted to connect said primary helix with a source of varying currents of electricity, a motor adapted to be connected with same said source of varying currents of electricity and further adapted to be operated by said varying currents of electricity, a mass of iron of suitable form mounted on the shaft of said motor to be adjustable with respect to its circumferential position thereon and so disposed with respect to said transformer that a rotation of said shaft of said motor may affect the amount of electrical energy generated in the secondary helix of said transformer at a desired instant of time, a spark-gap electrode of suitable metal mounted to revolve end over end on same said shaft of said motor to be adjustable with respect to its circumferential position thereon and adapted to be maintained in electrical connection with one terminal of the secondary helix of said transformer, a normally fixed but adjustably supported spark-gap electrode disposed with one of its ends adjacent to the path of the ends of said electrode on said shaft and adapted to be connected with the other terminal of the secondary of said transformer, a condenser having one of its terminals connected with said normally fixed electrode and with one terminal of the secondary helix of said transformer, and an inductance having one of its terminals connected with the other terminal of said condenser while its other terminal is connected with the other terminal of said secondary helix of said transformer.

3. In a wireless telegraph system, a transformer provided with a primary helix surrounding one portion of its iron core and with a secondary helix surrounding another and different portion of its core, of an alternating current motor upon whose shaft is mounted a suitably formed mass of iron which is adapted to be adjusted to a desired circumferential position on said shaft, said motor being disposed with relation to said transformer so that said mass of iron may form a path for magnetic lines of force that may be generated in the iron core of said transformer by electric currents flowing in said primary helix thereby to divert magnetic lines of force from that part of said iron core which is surrounded by said secondary helix whereby at desired instants of time a less amount of electric current may be generated in said secondary helix, a spark-gap electrode mounted on said shaft of said motor and adapted to be adjusted thereon with respect to its circumferential position, means for electrically connecting said electrode with an oscillating circuit, a normally fixed spark-gap electrode adjustably supported adjacent to said electrode on said shaft, a condenser and an inductance said condenser and said inductance being electrically connected with each other and with said secondary helix and with both of said electrodes, and a source of alternating current of electricity connected by suitable conductors with said primary helix and with said motor.

4. In a wireless telegraph system, the combination with the oscillating circuit of a wireless telegraph station, of an alternating current motor; a rotary spark-gap one electrode thereof connected so as to be actuated by said motor; an alternating current transformer; a source of an alternating current of electricity; conductors connecting the primary coil of said transformer and the terminals of said motors with said source of an alternating current of electricity; conductors connecting the secondary coil of said transformer with the electrodes of said spark-gap and with said oscillating circuit; and an iron bar armature adapted to be rotated end over end by said motor and disposed within the magnetic field of said transformer whereby the magnetic flux of said transformer may be affected by each revolution of the shaft of said motor.

In witness whereof, I, hereunto subscribe my name this 11th day of November A. D., 1912.

THOMAS BURTON MILLER.

Witnesses:
  FRANK WARREN,
  E. TOOP.